Patented Oct. 17, 1933

1,930,881

UNITED STATES PATENT OFFICE 1,930,881

MANUFACTURE OF HIGHLY CONCENTRATED NITRIC ACID

Emil Lüscher, Basel, Switzerland, assignor to firm Lonza Elektrizitatswerke und Chemische Fabriken Aktiengesellschaft, Gampel and Basel, Switzerland No Drawing. Application May 11, 1931, Serial No. 536,668, and in Switzerland May 13, 1930

2 Claims. (Cl. 23—160)

It is known to produce highly concentrated nitric acid from dilute nitric acid with nitrogen oxides and oxygen under pressure. This operation under pressure is mainly performed in autoclaves having a stirrer.

Now, I have found that in starting from a mixture of dilute nitric acid and nitrogen tetroxide the aforesaid oxidation can be effected in a very easy and very advantageous manner, if the oxygen is forced under pressure in the finest condition of division into the liquid of reaction, preferably by means of finely porous sieve plates, such as plates of coherent granular material, suitable ceramic plates, finely pierced metallic plates or any other plates having fine pores to greatly and uniformly divide the oxygen being pressed therethrough into the liquid of reaction.

Experiences have shown that a highly concentrated nitric acid can thus be obtained within a much shorter time than under the same working conditions according to the usual methods. Furthermore, the improved working affords the advantage that any movable parts, such as pumps, stirrers and the like can be avoided, which, as is well known, may easily give rise to service troubles in pressure apparatus.

The following example illustrates the advantages of the present invention:

From a mixture of nitric acid of 50 per cent strength with nitrogen tetroxide there was obtained at 80° C. by introduction of oxygen at a pressure of 15 atm. and without stirring within 30 minutes of nitric acid having 76 to 78 per cent strength.

When using the same solution under the same working conditions, but with the aid of a finely porous sieve plate through which the oxygen was pressed into the solution, a nitric acid of 95 per cent strength was obtained within 30 minutes. To obtain such concentration according to the first described method, a time of reaction of 3½ to 4 hours would be necessary.

What I claim is:

1. A process for the manufacture of highly concentrated nitric acid from dilute nitric acid, nitrogen tetroxide, and oxygen, comprising admixing the dilute nitric acid and the nitrogen tetroxide, and forcing oxygen in extremely finely subdivided state into the mixture at elevated temperature and at a pressure of at least 15 atmospheres.

2. The process set forth in claim 1, wherein the elevated temperature is about 80° C.

EMIL LÜSCHER.